US012353592B1

(12) United States Patent
Cheng

(10) Patent No.: US 12,353,592 B1
(45) Date of Patent: Jul. 8, 2025

(54) PROTECTION OF PERSONALLY IDENTIFIABLE INFORMATION OF USERS ON A COMPUTER NETWORK

(71) Applicant: Trend Micro Inc., Tokyo (JP)

(72) Inventor: Charles Hung-Ching Cheng, Sunnyvale, CA (US)

(73) Assignee: Trend Micro Incorproated, Tokyo (JP)

( * ) Notice: Subject to any disclaimer, the term of this patent is extended or adjusted under 35 U.S.C. 154(b) by 348 days.

(21) Appl. No.: 17/877,555

(22) Filed: Jul. 29, 2022

(51) Int. Cl.
*G06F 21/62* (2013.01)

(52) U.S. Cl.
CPC ................. *G06F 21/6245* (2013.01)

(58) Field of Classification Search
CPC ............. G06F 21/6245; G06F 21/6254; H04L 63/0421
See application file for complete search history.

(56) References Cited

U.S. PATENT DOCUMENTS

2008/0120411 A1\* 5/2008 Eberle .................... G06Q 50/10
709/225
2010/0313009 A1\* 12/2010 Combet .............. H04L 63/0421
709/224
2017/0091303 A1\* 3/2017 Rashid .................... G06N 20/00
2021/0097201 A1\* 4/2021 Wasicek .................. G06F 21/32

OTHER PUBLICATIONS

"Guidance on the Protection of Personal Identifiable Information", U.S. Department of Labor, https://www.dol.gov/general/ppii, downloaded Mar. 29, 2023.
"Personal Data", Wikipedia, https://en.wikipedia.org/wiki/Personal_data, downloaded Mar. 29, 2023.

\* cited by examiner

*Primary Examiner* — David R Lazaro
*Assistant Examiner* — Xiang Yu
(74) *Attorney, Agent, or Firm* — Beyer Law Group LLP

(57) ABSTRACT

A cybersecurity system protects personally identifiable information (PII) of users on a computer network. A webpage received in an endpoint computer of the cybersecurity system is parsed to detect one or more input fields that ask a user of the endpoint computer for a PII. Instead of entering the PII of the user into an input field, a substitute value for the PII of the user is entered into the input field based at least on a website that served the webpage to the endpoint computer.

7 Claims, 5 Drawing Sheets

| Input Field | Primary (Real) | Secondary | "Fake" |
|---|---|---|---|
| Last Name | Smith | Smith | Smyth |
| First Name | John | John | Jon |
| Date of Birth | 2/28/1970 | Not Available | Not Available |
| Social Security No | 321-567-098 | Not Available | Not Available |
| Email Address | john.smith@gmail.com | jsmith2000@gmail.com | jdude@gmail.com |
| Telephone | 408-321-1078 | 408-257-1500 | 123-456-7890 |
| Street Address | 123 Waverly Street | 500 Winchester Blvd #400 | 999 Yellow Brick Road |
| City | Palo Alto, CA 94306 | San Jose, CA 95128 | San Jose, CA 95128 |
| ..... | | | |

FIG. 2

| Input Field | Financial | Government | eCommerce | Online Gaming | Social Media | ... |
|---|---|---|---|---|---|---|
| Name | Primary | Primary | Primary | Fake | Fake | |
| Date of Birth | Primary | Primary | Equivalent | Equivalent | Equivalent | |
| Social Security No | Primary | Primary | Fake | Fake | Fake | |
| Email Address | Primary | Primary | Secondary | Primary | Fake | |
| Home/Billing Address | Primary | Primary | Primary | Fake | Fake | |
| Shipping/Mailing Address | | | | | | |
| ... | | | | | | |

FIG. 3

PROTECTION OF PERSONALLY IDENTIFIABLE INFORMATION OF USERS ON A COMPUTER NETWORK

TECHNICAL FIELD

The present invention is directed to cybersecurity, and more particularly but not exclusively to protecting personally identifiable information transmitted over a computer network.

BACKGROUND

Personally identifiable information (PII) is information that permits the identity of an individual to be directly or indirectly inferred. Examples of PII include names, date of birth, residence address, phone number, etc. PII and related privacy issues are especially relevant on the Internet because of the ease of acquiring PII electronically by legitimate and malicious means. More particularly, some websites on the Internet require users to provide PII to register and obtain services. These websites are susceptible to being hacked, thereby compromising PII provided by users to the websites. These websites may also exchange or sell PII with other entities.

BRIEF SUMMARY

In one embodiment, a method of protecting personally identifiable information (PII) of users on a computer network includes receiving, by an endpoint computer, a webpage served by a website over the Internet. The webpage is displayed on a display screen of the endpoint computer. The webpage is parsed to identify an input field that asks for a PII of a user of the endpoint computer. A substitute value for the PII of the user, instead of the PII of the user, is automatically entered into the input field based at least on the website that served the webpage.

In another embodiment, a computer system comprises a processor and a memory, the memory storing instructions that when executed by the processor cause the system to: receive a webpage served by a website over the Internet; display the webpage on a display screen of the computer system; parse the webpage to identify an input field that asks for a PII of a user; and automatically enter an input value into the input field based at least on the website that served the webpage, wherein the input value is not the PII of the user.

In yet another embodiment, a method of protecting personally identifiable information (PII) of users on a computer network includes receiving, by an endpoint computer, a webpage served by a website over the Internet. The webpage is displayed on a display screen of the endpoint computer. The webpage is parsed to identify an input field that asks for a PII of a user of the endpoint computer. A category of the website is determined. An input value is automatically entered into the input field based at least on the website, wherein the input value is not the PII of the user.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 shows example contents of a PII database in accordance with an embodiment of the present invention.

FIG. 3 shows example contents of a mapping database in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
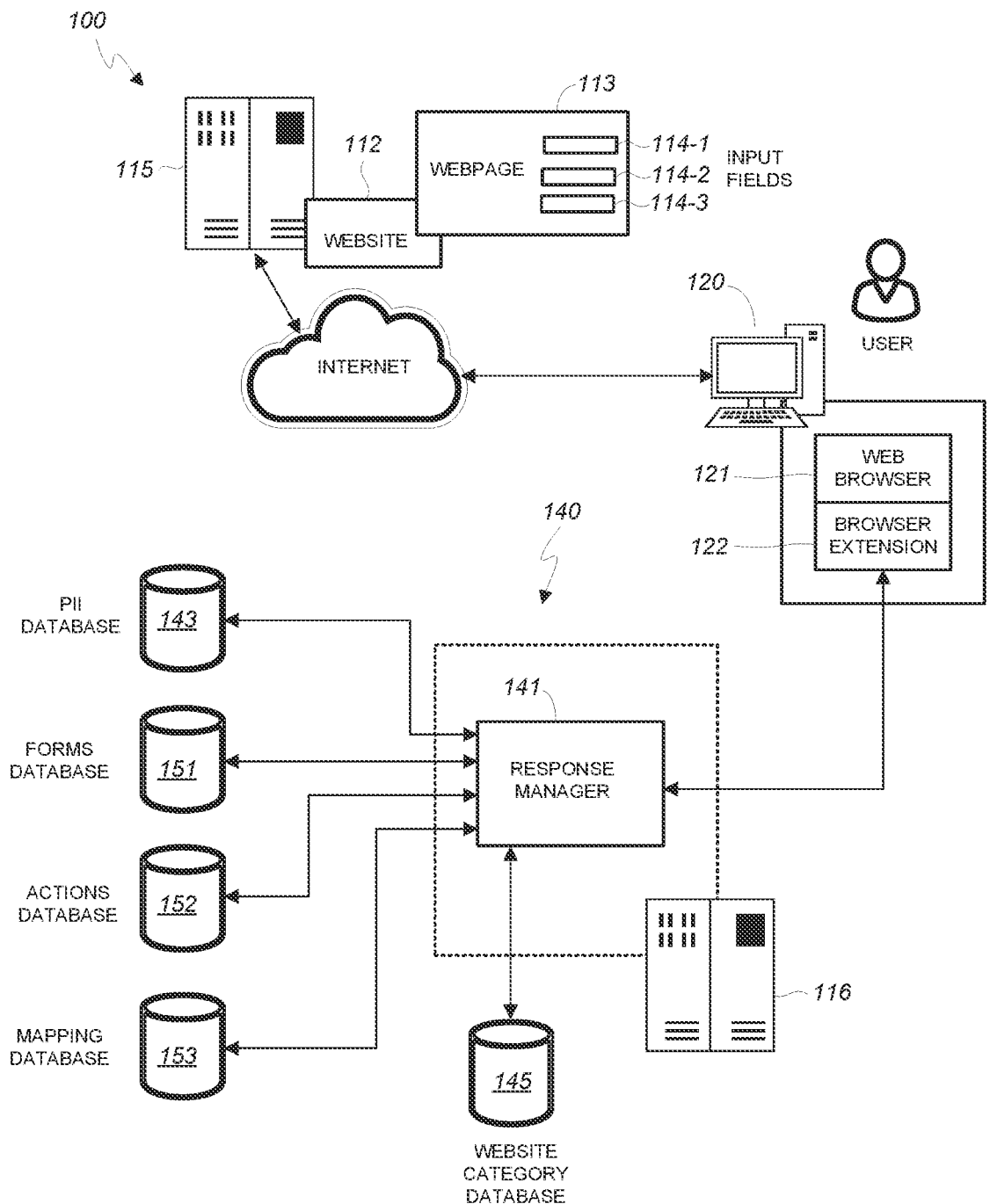
FIG. 1 shows a logical diagram of a cybersecurity system for protecting PII of users on a computer network in accordance with an embodiment of the present invention.

FIG. 1 shows a logical diagram of a cybersecurity system 100 for protecting personally identifiable information (PII) of users on a computer network in accordance with an embodiment of the present invention. In the example of FIG. 1, the system 100 protects PII transmitted over a computer network that includes the Internet. As will be more apparent below, the system 100 automatically enters a PII or a substitute for the PII (e.g., a fake or equivalent value) as an input value in an input field of a webpage based on the context of the webpage, e.g., the particular input field, type of the input field, and/or category of the website that served the webpage. The system 100 thus proactively protects a PII of a user by minimizing exposure of the PII on the Internet.

In the example of FIG. 1, the system 100 includes an endpoint computer 120 and PII protection modules 140. One or more of the PII protection modules 140 may be implemented as program code (i.e., software) running on the endpoint computer 120 or on another computer in communication with the endpoint computer 120. In the present disclosure, "automatic" refers to a step performed by program code as opposed to a step manually performed by a user, i.e., human. For example, automatic entry of an input value in an input field means that the input value is entered by program code rather than by a user manually pressing keys on a keyboard.

A user employs an endpoint computer 120 to access one or more servers 115 on the Internet. The endpoint computer 120 may be a desktop, laptop, or other computing device. A server 115 may comprise a server computer with suitable server software for hosting a website 112 that serves one or more webpages 113 to the endpoint computer 120 and other computers over the Internet.

The website 112 may be a financial (e.g., banking), social media (e.g., Facebook™ and Reddit™ websites), government, e-commerce (i.e., electronic commerce), online gaming, webmail, or other website that receives PII from users. Only one server 115 and one endpoint computer 120 are shown on FIG. 1 for clarity of illustration. As can be appreciated, there are multitudes of web servers on the Internet. Furthermore, the system 100 may include a plurality of endpoint computers 120 and other network components that are not shown.

The endpoint computer 120 runs a web browser 121, such as the Google Chrome™ browser, Microsoft Edge™ browser, etc. The user employs the web browser 121 to access the website 112 over the Internet. The website 112 provides a webpage 113, which is displayed by the web browser 121 on a display screen of the endpoint computer 120. The web browser 121 may incorporate a browser extension 122 for receiving the content of the webpage 113 from the web browser 121 and for communicating with the PII protection modules 140. The web browser 121 may pass webpage content to the browser extension 122 through one or more Document Object Model (DOM) elements, for example.

The browser extension 122 parses the content of the webpage 113 for one or more input fields 114 (i.e., 114-1, 114-2, 114-3, . . . ) that ask the user to provide a PII. In one embodiment, an input field 114 is uniquely identified by a globally unique identifier (GUID) consisting of at least a top-level domain of the website 112, uniform resource locator (URL) path of the webpage 113, and the "id" attribute of the input field 114. The browser extension 122 sends a response manager 141 of the PII protection modules 140 a notification that the webpage 113 has been received in the endpoint computer 120, any input field (as identified by corresponding GUIDs) on the webpage 113, and other relevant data. In conjunction with the PII protection modules 140 and depending on the context of the webpage 113, the browser extension 122 automatically enters or causes to enter a value, such as a PII of the user or a substitute for the PII of the user, into an input field 114 on the webpage 113. In cases where the system 100 has no relevant data to automatically enter a value in an input field 114, the browser extension 122 may prompt the user to manually enter a value in the input field 114. In that case, the response manager 141 may record the user-entered value in the forms database 151 for later use.

As can be appreciated, instead of using a browser extension, embodiments of the present invention may also be implemented using a separate computer program that is configured to monitor web pages received in the endpoint computer 120, parse the webpages for input fields that ask a user for PII, and, in conjunction with the PII protection modules 140, automatically enter values in the input fields based on the context of the webpage.

The webpage 113 may ask the user to enter PII into one or more input fields 114 on the webpage 113. An input field 114 may be a text input field, a checkbox, a drop-down or pop-up menu (e.g., menu for selecting state, city, province, country; menu for entering month, day, year; etc.), or other kind of user interface that allows for data entry, selection, and/or deletion. For example, the webpage 113 may be a sign-up page that asks the user to enter her name, residence address, date of birth, phone number, or other PII. PII for purposes of the present disclosure includes information considered as PII by one or more laws or regulations, such as the Children's Online Privacy Protection Act (COPPA), the EU General Data Protection Regulation (GDPR), the California Consumer Privacy Act of 2018 (CCPA), etc.

The system 100 includes the PII protection modules 140. In the example of FIG. 1, the PII protection modules 140 is comprised of the response manager 141, a PII database 143, the forms database 151, an actions database 152, a mapping database 153, and a website category database 145. Generally, a database may be implemented as a database, listing, or other datastore on a data storage device.

One or more of the PII protection modules 140 may be running on the endpoint computer 120 or on another computer in communication with the endpoint computer 120. For example, all of the PII protection modules 140 may be running on a backend server computer 116 that is in communication with the endpoint computer 120 over the Internet or a private computer network. As another example, the response manager 141, PII database 143, forms database 151, actions database 152, and mapping database 153 may be running on the endpoint computer 120, with the website category database 145 being on another computer that is in communication with the endpoint computer 120. As can be appreciated, components or functionality of the system 100 may be on one computer or distributed over two or more computers.

The website category database 145 stores categories of websites. The category of a website is indicative of a nature of the website, such as a function or service provided by the website. Examples of website categories include financial, government, e-commerce (i.e., electronic commerce), online gaming, social media, etc. For example, the website category database 145 may indicate that the Facebook™ website is a social media website, the Wells Fargo™ website is a financial website, etc. Website categories may be compiled and maintained by cybersecurity researchers. The website category database 145 may be maintained as part of the system 100 or accessed as a third-party service provided by a cybersecurity vendor.

The PII database 143 stores the PII of one or more users. The PII of a user may include the user's real name, phone number, residence address, shipping address, social security number, driver's license number, etc. In one embodiment, during setup of the system 100, the user is asked to provide a primary PII, a secondary PII, and/or a "fake" value for storage in the PII database 143. This allows the response manager 141 to retrieve a value for a PII if needed to be entered in an input field.

The primary PII, which is also referred to herein as "real PII", is the PII that the user typically provides to governments, financial institutions, and other entities that require the user's real information. The secondary PII, also referred to herein as "burner PII", is PII that raises no privacy-related concerns to the user. An example secondary PII is an email address that a user primarily uses on unknown websites. Another example secondary PII is a shipping address that is not the user's residence address.

As its name indicates, a fake value is not a PII of the user. On certain webpages of certain websites, a fake value may be used as a substitute for a PII. A fake value may be automatically generated or selected, i.e., generated or selected by program control instead of being received from a user. This advantageously relieves the user from having to come up with and remember fake values. A fake value for an input field may be retrieved from the PII database 143, randomly-generated, or arbitrarily generated or selected from a predefined list of fake values.

FIG. 2 shows example contents of the PII database 143 in accordance with an embodiment of the present invention. The PII database 143 may store information for one or more users. The user may be prompted to provide primary, secondary, and fake values for entry in the PII database 143 during setup.

FIG. 2 shows information for a particular user, which in this example is "John Smith". The user John Smith has a designated primary (see column 202), secondary (see column 203), and fake (see column 204) values for different types of input fields (see column 201). For example, for an input field asking for the user's last name (see row 211), "Smith" will be entered when a primary PII is to be provided, "Smith" will be entered when a secondary PII is to be provided, and "Smyth" (note the misspelling) will be entered when a fake value is to be provided. As another example, for an input field asking for the user's telephone number (see row 212), "408-321-1078" will be entered (e.g., the user's residential phone number) when a primary PII is to be provided, "408-257-1500" (e.g., the user's work phone number) will be entered when a secondary PII is to be provided, and "123-456-7890" (e.g., an arbitrary phone number not associated with the user) will be entered when a fake value is to be provided. In the example of FIG. 2, a blank or "Not Available" may indicate that there is no designated value for the input field, such as when the user did not provide one.

In one embodiment, the forms database 151 stores values that were entered into previously encountered input fields. A plurality of GUID-value pairs may be recorded in the forms database 151, with each pair identifying a value to be entered in a particular input field identified by the GUID. This way, when the particular input field is received in the endpoint computer 120, the value to be entered in the particular input field may simply be retrieved from the forms database 151. Values in the forms database 151 may have been provided by the user or by the response manager 141.

In one embodiment, the actions database 152 stores a static mapping of an input field (as identified by its GUID) to an action. The action for an input field indicates the type of value to be entered into the input field. In one embodiment, the possible actions for an input field includes: using a primary PII; using a secondary PII; using an equivalent value; and using a fake value. A plurality of GUID-action pairs may be stored in the actions database 152, with each pair identifying a specified action for a particular input field identified by the GUID. For example, a known input field on a webpage of a known government website may have its GUID paired with the action "primary"—i.e., enter a primary PII into the input field. GUID-action pairs may be compiled and maintained by cybersecurity researchers.

In one embodiment, the mapping database 153 stores a mapping of an input field type and website category to an action. That is, given a type of input field and a category of the website that provided the webpage, the mapping database 153 returns a specified action. As explained with reference to the actions database 152, the specified actions may include using a primary PII; using a secondary PII; using an equivalent value; or using a fake value to enter into a corresponding input field, which is of a particular type and is on a webpage received from a website of a particular category. It is to be noted that once the value to be entered into an input field has been determined based on the combination of the input field type, the website category, and corresponding action, the value can be recorded and associated with a GUID for later retrieval.

FIG. 3 shows example contents of the mapping database 153 in accordance with an embodiment of the present invention. In the example of FIG. 3, the types of input fields (see column 301) may include Name, Date of Birth, Social Security Number, Email Address, Home/Billing Address, Shipping/Mailing Address, etc. A Name type input field asks for a user's first name, last name, or both; a Date of Birth type input field asks for the user's date of birth, etc. The website categories may include Financial (see column 302), Government (see column 303), e-commerce (see column 304), Online Gaming (see column 305), Social Media (see column 306), etc.

Like a fake value, an equivalent value is a substitute for a user's PII and is not the user's PII. However, an equivalent value, as its name suggests, is equivalent to (but not the same as) the user's PII. Equivalent values may be used for input fields where an equivalent is appropriate, such as a Date of Birth type input field for determining the user's age.

As a particular example, the mapping database 153 specifies that an Equivalent is to be entered in an input field that is a Date of Birth type (see row 312) on a webpage received from a website that has a category of e-commerce (see column 304), Online Gaming (see column 305), or Social Media (see column 306). For those input fields, the response manger 141 may generate an equivalent date of birth that is within a predetermined number of days from the user's real date of birth so as to be able to indicate the user's age without disclosing the user's real date of birth. As another example, for input fields that is of a residence address type, the response manager 141 may generate an equivalent address that is in the vicinity (e.g., the next city) of the user's real address.

In the example of FIG. 2, the mapping database 153 specifies that for an input field of a Name type (see row 311), the user's primary first and/or last name is to be entered when the input field is on a webpage from a website that has a category of Financial (see column 302), government (see column 303), or e-commerce (see column 304). However, for the same type of input field (i.e., Name type), the mapping database specifies entering a fake value when the input field is on a webpage from a website that has a category Online Gaming (see column 305) or Social Media (see column 306).

Referring back to FIG. 1, the response manager 141 determines what input value to enter in an input field 114 on a webpage 113 received in the endpoint computer 120. In one embodiment, the response manager 141 is implemented as program code executed by a processor.

The response manager 141 may receive from the browser extension 122 data associated with receiving a webpage 113 in the endpoint computer 120, including information on input fields 114 (e.g., GUIDs) on the webpage 113. In the case of previously encountered input fields 114, the response manager 141 may provide values to be entered in the input fields 114 in accordance with values recoded in the forms database 151. The response manager 141 may also provide fake or equivalent values to be entered in the input fields 114 based on the particular input field 114 and/or type of the input field 114 and category of the website 112. Advantageously, the substitute values (e.g., fake or equivalent values) do not necessarily have to be provided or selected by the user and do not have to be remembered by the user because substitute values and PII may be automatically entered into corresponding input fields.

The response manager 141 identifies input fields 114 that ask a user for a PII and determines a type of the input field 114. The response manager 141 may employ a conventional algorithm to identify input fields that require a PII and their type, such as algorithms employed by conventional password managers and form autofill programs, which might also integrate human-curated data. The response manager 141 may also employ conventional webpage parsing algorithms to identify and determine the type of input fields of a webpage. In one embodiment, the response manager 141 accesses the website category database 145 to determine a category of a website that served a webpage.

Figure 4:
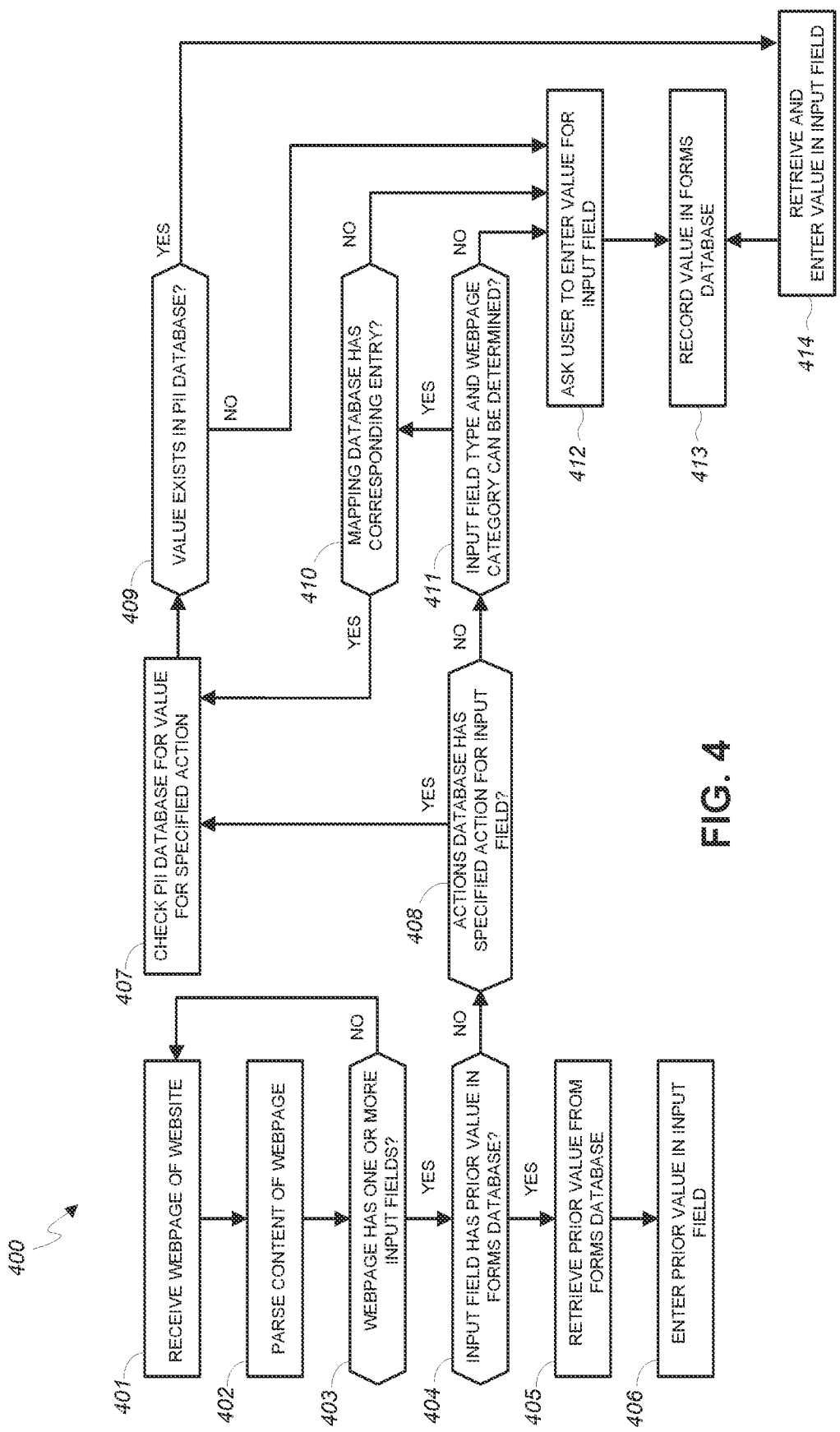
FIG. 4 shows a flow diagram of a method of protecting PII of users on a computer network in accordance with an embodiment of the present invention.

FIG. 4 shows a flow diagram of a method 400 of protecting PII of users on a computer network in accordance with an embodiment of the present invention. The method 400 is explained using components of the system 100 of FIG. 1 for illustration purposes. As can be appreciated, other components may also be employed without detracting from the merits of the present invention.

In the example of FIG. 4, a webpage 113 of a website 112 is received in an endpoint computer 120 (step 401). A web browser 121 that is running on the endpoint computer 120 parses the webpage 113 to obtain its content and provides the content to a browser extension 122 (step 402). The browser extension 122 provides the content and associated data of the webpage 113 to a response manager 141. The browser extension 122 parses the content of the webpage 113 to identify one or more input fields 114 (step 403). If the webpage 113 has no input field 114, the browser extension 122 waits for the endpoint computer 120 to receive another webpage from a website (step 403 to step 401). If the webpage 113 has an input field 114 (step 403 to step 404), the browser extension so informs the response manager 141 and passes the content of the webpage 113 to the response manager 141. Note that the following steps may be performed for each input field 114 on the webpage 113.

The response manager 141 checks the forms database 151 for a prior value for the input field 114 (step 404), with the input field 114 being uniquely identified by its GUID. The prior value may have been manually entered by the user in the input field 114 or automatically entered in the input field 114 when the input field 114 was received in the endpoint computer 120 in a previous occasion. If the input field 114 has a prior value recorded in the forms database 151, the response manager 141 retrieves the prior value from the forms database 151 (step 404 to step 405). The response manager 141 provides the prior value to the browser extension 122, which automatically enters the prior value in the input field 114 on the webpage 113 (step 406).

If the input field 114 has no prior value stored in the forms database 151, the response manager 141 determines if the actions database 152 has a specified action for the input field 114 (step 404 to step 408). If the actions database 152 has a specified action for the input field 114, the response manager 141 checks the PII database 143 for a value for the specified action (step 408 to step 407). If the PII database 143 has a value for the specified action, the response manager 141 retrieves the value for the specified action from the PII database 143 for entry into the input field 114 (step 409 to step 414). For example, the response manager 141 may provide the value retrieved from the PII database 143 to the browser extension 122, which automatically enters the value in the input field 114 on the webpage 113. The response manager 141 records the value in the forms database 151 (step 413), thereby becoming a prior value for the input field 114.

If the PII database 143 has no value for the specified action, the system 100 prompts the user to manually enter a value for the input field 114 (step 409 to step 412). For example, the response manager 141 may instruct the browser extension 122 to message the user (e.g., on a pop-up window) to manually enter a value for the input field 114. The browser extension 122 may pass to the response manager 141 the value entered by the user into the input field 114. The response manager thereafter records the value in the forms database 151 (step 413).

If the actions database 152 has no specified action for the input field 114, the response manager 141 determines if the type of the input field 114 and a category of the website 112 can be determined (step 408 to step 411). The response manager 141 determines the type of the input field 114 and the category of the website 112 if they can be determined and then checks the mapping database 153 if the type of the input field 114 in combination with the category of the website 112 has a specified action (step 411 to step 410). If so, the response manager 141 checks the PII database 143 for a value for the specified action (step 410 to step 407). Thereafter, the method 400 follows the steps beginning from step 407 to obtain the value for the specified action from either the PII database 143 (step 409 to step 414) or the user (step 409 to step 412) for entry in the input field 114 and recording in the forms database 151 (step 413) as previously described.

If the type of the input field 114 in combination with the category of the website 112 has no specified action in the mapping database 153, the value for the input field 114 is obtained from the user (step 410 to step 412) and then recorded in the forms database 151 (step 413) as previously described.

In some situations, the type of the input field 114 and/or a category of the website 112 cannot be determined. This is the case, for example, when the website 112 has no entry or has an undetermined entry in the website category database 145 or when the type of the input field 114 is unknown. If the type of the input field 114 and a category of the website 112 cannot be determined, the value for the input field 114 is obtained from the user (step 411 to step 412) and then recorded in the forms database 151 (step 413) as previously described.

Figure 5:
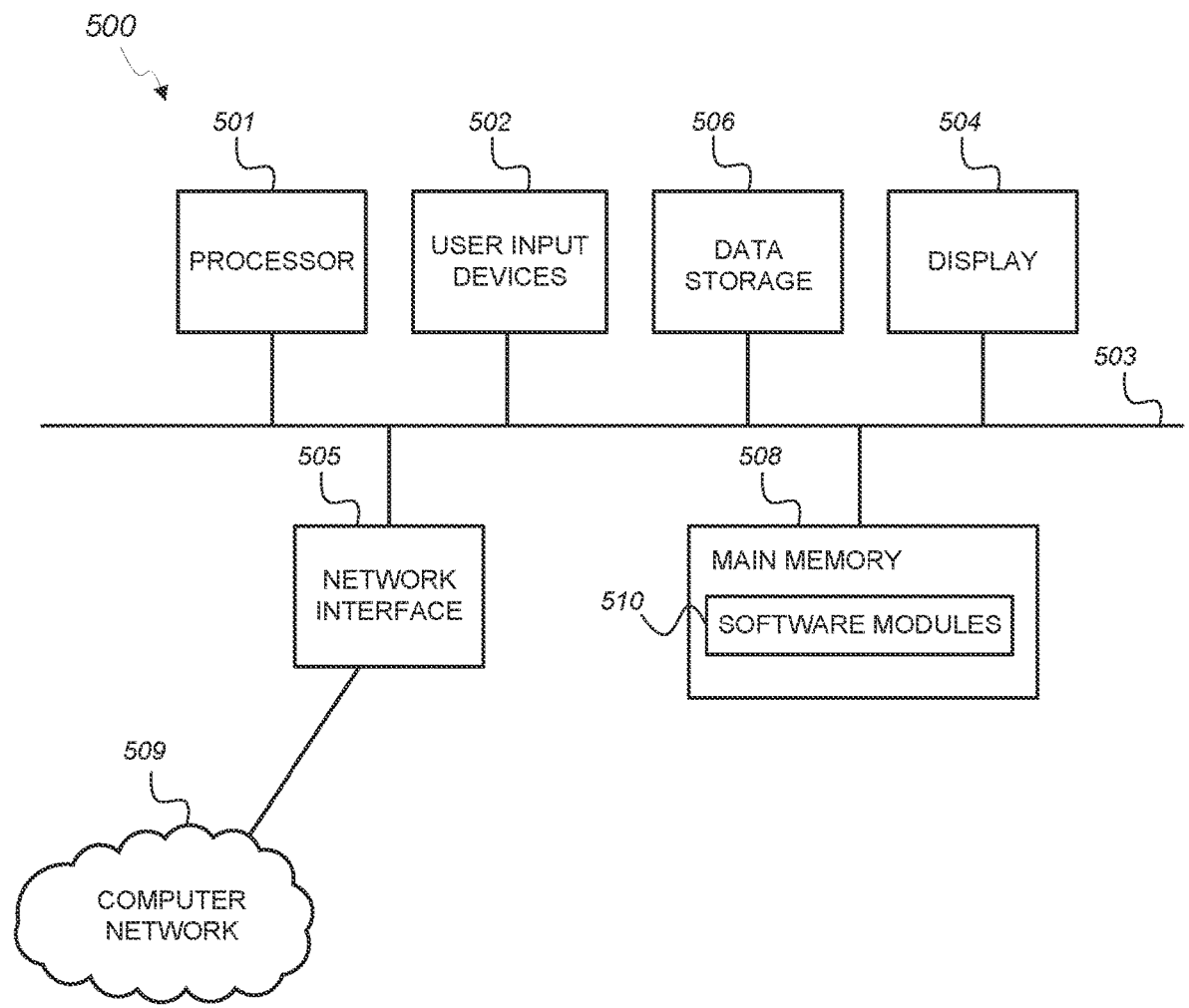
FIG. 5 shows a logical diagram of a computer system that may be employed with embodiments of the present invention.

Referring now to FIG. 5, there is shown a logical diagram of a computer system 500 that may be employed with embodiments of the present invention. The computer system 500 may be employed as an endpoint computer, backend server, or other computer described herein. The computer system 500 may have fewer or more components to meet the needs of a particular cybersecurity application. The computer system 500 may include one or more processors 501. The computer system 500 may have one or more buses 503 coupling its various components. The computer system 500 may include one or more user input devices 502 (e.g., keyboard, mouse), one or more data storage devices 506 (e.g., hard drive, optical disk, solid state drive), a display screen 504 (e.g., liquid crystal display, flat panel monitor), a computer network interface 505 (e.g., network adapter, modem), and a main memory 508 (e.g., random access memory). The computer network interface 505 may be coupled to a computer network 509, which in this example includes the Internet.

The computer system 500 is a particular machine as programmed with one or more software modules 510, comprising instructions stored non-transitory in the main memory 508 for execution by the processor 501 to cause the computer system 500 to perform corresponding programmed steps. An article of manufacture may be embodied as computer-readable storage medium including instructions that when executed by the processor 501 cause the computer system 500 to be operable to perform the functions of the one or more software modules 510.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting personally identifiable information (PII) of users on a computer network, the method comprising:
   receiving, by an endpoint computer, a first webpage served by a first website over the Internet;
   displaying the first webpage on a display screen of the endpoint computer;

parsing the first webpage to identify a first input field that asks for a PII of a user of the endpoint computer;

retrieving a category of the first website from a website category database that stores categories of websites, wherein the category of the first website is indicative of a function or service provided by the first website;

consulting a mapping database to determine whether to enter in the first input field the PII of the user or a substitute value for the PII of the user based at least on a type of the first input field and the category of the first website, wherein the mapping database stores a mapping of input field types and website categories to corresponding actions that specify predetermined values to be entered into corresponding input fields;

responsive to the mapping database not including an entry for the type of the first input field and the category of the website, asking the user to enter a value for the first input field; and responsive to the mapping database including the entry for the type of the first input field and the category of the website, automatically entering a substitute value for the PII of the user, instead of the PII of the user, into the first input field in accordance with the entry for the type of the first input field and the category of the website in the mapping database.

2. The method of claim 1, further comprising:

uniquely identifying the first input field by a globally unique identifier.

3. The method of claim 1, wherein the first input field asks for a name of the user and the substitute value is not a real name of the user.

4. The method of claim 1, wherein the first input field asks for a date of birth of the user and the substitute value is not a real date of birth of the user.

5. The method of claim 4, wherein the substitute value is a date of birth that is a number of days from the real date of birth of the user.

6. The method of claim 1, further comprising:

receiving, by the endpoint computer, a second webpage served by a second website over the Internet;

displaying the second webpage on the display screen of the endpoint computer;

parsing the second webpage to identify a second input field that asks for the PII of the user;

uniquely identifying the second input field by a globally unique identifier;

in response to detecting that the second input field has been encountered in the endpoint computer in a previous occasion based on the globally unique identifier of the second input field, entering a previous value into the second input field, wherein the previous value was entered into the second input field in the previous occasion.

7. A computer system comprising at least one processor and a memory, the memory storing instructions that when executed by the at least one processor cause the computer system to:

receive a webpage served by a website over the Internet;

display the webpage on a display screen of the computer system;

parse the webpage to identify an input field that asks for a personally identifiable information (PII) of a user;

retrieve a category of the website from a website category database that stores categories of websites, wherein the category of the website is indicative of a function or service provided by the website;

check a mapping database to determine whether to enter in the input field the PII of the user or a substitute value for the PII of the user based at least on a type of the input field and the category of the website, wherein the mapping database stores a mapping of input field types and website categories to corresponding actions that specify predetermined values;

ask the user to enter a value for the input field when the mapping database does not include an entry for the type of the input field and the category of the website; and automatically enter a substitute value for the PII of the user, instead of the PII of the user, into the input field in accordance with the entry for the input field and the category of the website in the mapping database when the mapping database includes the entry for the type of the input field and the category of the website.

* * * * *